United States Patent [19]

Tunoda

[11] 4,076,851
[45] Feb. 28, 1978

[54] METHOD AND APPARATUS FOR PRODUCING FINE DEODORIZED SOYBEAN POWDER

[76] Inventor: Tutae Tunoda, Oaza Joshikimen 944-1, Fukaya (Saitama), Japan

[21] Appl. No.: 757,147

[22] Filed: Jan. 6, 1977

[30] Foreign Application Priority Data

Sep. 9, 1976  Japan ............................... 51-108241

[51] Int. Cl.² .............................................. B02B 3/00
[52] U.S. Cl. ...................................... 426/431; 99/472; 99/568; 241/7; 241/11; 241/78; 426/464; 426/486; 426/482
[58] Field of Search ............... 426/486, 461, 482, 464, 426/598, 463, 507, 448, 443, 431, 436, 468, 460, 459; 100/91, 92, 73, 74, 75, 38, 39; 241/78, 76, 13, 11, 7, 29, 2; 99/472, 469, 483, 516, 568, 601, 537, 538, 519; 15/3.1

[56] References Cited

U.S. PATENT DOCUMENTS

| Re. 10,275 | 1/1883 | Teter ................................... 99/516 X |
| 917,016 | 4/1909 | Davidson ............................... 99/519 |
| 1,758,272 | 5/1930 | Anderson ........................... 100/74 X |
| 2,182,175 | 12/1939 | Gates ................................. 426/468 X |
| 2,260,254 | 10/1941 | Kruse et al. ........................... 426/459 |
| 2,710,258 | 6/1955 | Kruse ................................. 426/459 X |
| 3,290,155 | 12/1966 | Mustakas et al. ................. 426/448 X |
| 3,782,968 | 1/1974 | Herzberg et al. .................... 241/7 X |
| 3,829,589 | 8/1974 | Matsunaga ....................... 426/443 X |

OTHER PUBLICATIONS

Smith et al., Soy Beans, Chemistry & Technology, vol. 1, 1972, The Avi. Pub. Co. Inc., Westport, Conn., p. 312.

*Primary Examiner*—Kenneth M. Schor
*Attorney, Agent, or Firm*—Irving M. Weiner; Pamela S. Austin

[57] ABSTRACT

A method and apparatus for producing fine deodorized soybean powder in which washed and dyhydrated soybeans are pressed flat to a degree not to remove fat from the vegetable. The pressed soybeans are: dried to a moisture content of about 3% in a low temperature atmosphere; coarsely ground to the grain size of mesh; and stripped of the seed coats to leave only the seed leaves by a blast of air. The seed leaves are cooked to deodorize them for a short time period and at the same time excess moisture is removed from the seed leaves by vacuum suction. The seed leaves are ground to a grain size of 80 - 90 mesh and the seed leaves are further finely ground to a grain size of 1000 mesh.

10 Claims, 1 Drawing Figure

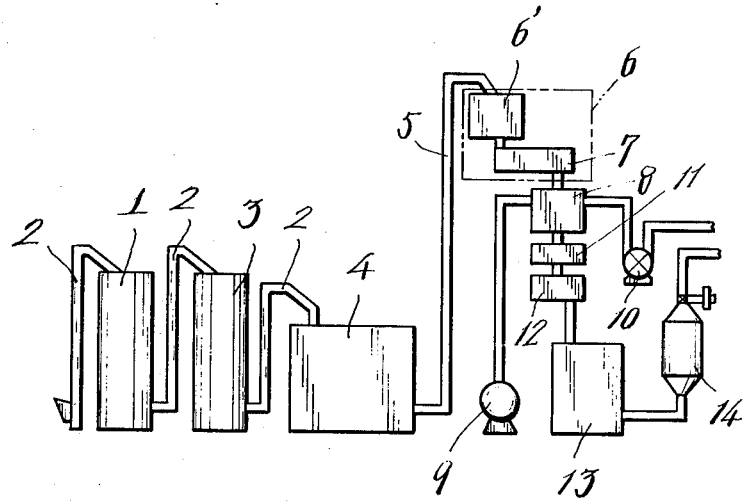

METHOD AND APPARATUS FOR PRODUCING FINE DEODORIZED SOYBEAN POWDER

This invention relates to a method and apparatus for producing fine deodorized soybean powder which is used as an additive for drinks, such as milk and the like, and foods, such as confectionary and bakery items.

BACKGROUND OF THE INVENTION

Soybean is a vegetable of high nutritive value and contains fat and protein in a substantial proportion and therefore, the vegetable has a very wide range of applications.

Although it has been relatively easy to separately extract individual constituent ingredients of soybean from the vegetable, and means for extracting soybean oil or producing soybean with fat removed from the raw soybeans have been widely known, it has been heretofore considered relatively difficult to obtain processed soybean goods retaining all the soybean constituent ingredients therein as they are and especially, soybean powder from the raw soybeans. The reason for the difficulty is that it has been difficult to devise effective means for removing the odor inherent in raw soybeans from the vegetable (the odor emitted from soybean fat). Especially, when raw soybeans are processed to deodorize at high temperatures on the one hand, the soybeans are rendered to a fat removed state resulting in decomposition of the nutrients of the vegetable. When raw soybeans are processed at low temperatures on the other hand, because oil pressing is performed when the raw soybeans are pressed flat, the nutritive value of the soybeans is reduced, and moreover, the soybeans are not perfectly deodorized.

As indicated by the foregoing, the conventional methods for producing soybean powder have deprived the raw soybeans of a substantial portion of the constituent ingredients of the vegetable, and especially the fatty ingredients of the vegetable to the degree that the processed soybeans have to be subsequently provided with new fatty ingredients. Thus, the conventional methods have been uneconomical and the particle size of soybean powder obtainable by the conventional methods has been limited to the range of 200–300 mesh to the utmost.

Furthermore, the conventional methods for producing soybean powder have the disadvantages that when means are provided to increase the proportion of residual fatty ingredients in the obtained soybean powder, the deodorization degree of the soybean powder is not only reduced, but the particles of the powder are necessarily made coarse because the residual fatty ingredients have a high viscosity.

SUMMARY OF THE INVENTION

The present invention provides a method of producing fine deodorized soybean powder, comprising the steps of washing raw soybeans, and then pressing the soybeans flat to a degree not to remove fat from the soybeans. The pressed soybeans are then dried in a substantially low temperature environment to obtain a first predetermined moisture content. Thereafter the soybeans are coarsely ground to a coarse grain size, and the soybean seed coats are separated from the soybean seed leaves. The soybean leaves are digested, and then deodorized. Excess moisture is removed from the soybean leaves so that the soybean leaves attain a predetermined moisture content. The soybean leaves are then intermediately ground to an intermediate grain size. Thereafter, the intermediately ground soybean leaves are finally ground to a fine grain size.

The present invention also provides an apparatus for performing the foregoing method, wherein the apparatus comprises a means for washing raw soybeans, and means for pressing the soybeans flat to a degree not to remove fat from the soybeans. The apparatus also includes a means for drying the pressed soybeans in a substantially low temperature environment to attain a first predetermined moisture content. There is also provided a means for coarsely grinding the soybeans to a coarse grain size and separating the soybean seed coats from the soybean seed leaves. There is also provided a means for digesting the soybean leaves, and means for deodorizing the soybean leaves. The apparatus also includes a means for removing excess moisture from the soybean leaves so that the soybean leaves attain a second predetermined moisture content. The apparatus further includes a means for intermediately grinding the soybean leaves to a intermediate grain size. The apparatus further includes means for finely grinding the intermediately ground soybean leaves to a fine grain size.

The present invention provides a method and apparatus for producing fine deodorized soybean powder of very small particle sizes by eliminating the disadvantages inherent in the above-mentioned conventional methods with a high deodorization effect and a high residual fat proportion.

One principal object of the present invention is to provide a novel and improved method for producing soybean powder of very fine particle size so as to retain substantially all of the constituent ingredients of raw soybeans in the obtained soybean powder and also to deodorize the soybean powder.

Another object of the present invention is to provide a method for producing fine deodorized soybean powder in a quite short period of time and in a simple manner.

A further object of the present invention is to provide an apparatus for carrying out the method.

BRIEF DESCRIPTION OF THE DRAWING

The sole FIGURE of the accompanying drawing is a schematic view of an apparatus for producing fine deodorized soybean powder constructed in accordance with the present invention.

DETAILED DESCRIPTION

The present invention will now be described in detail referring to the accompanying drawing which shows one preferred embodiment of apparatus of the invention for illustration purpose only, but not for limiting the scope of the same in any manner.

According to the present invention, the method for producing fine deodorized soybean powder comprises the steps of: pressing preliminarily washed and dehydrated raw soybeans flat to the degree not to remove fat from the soybeans; drying the soybeans in a substantially low temperature environment or atmosphere to the degree that the soybeans attain a first predetermined moisture content of about 3%; coarsely grinding the soybeans to a grain size on the order of about 10 mesh; separating the seed coats and seed leaves from each other by an air blast; digesting the remaining seed-free seed leaves in a digester for a short period of time to deodorize the seed leaves and at the same time to remove excess moisture from the deodorized seed leaves by vacuum suction; intermediately grinding the seed leaves to a medium grain size range (80 – 90 mesh) at a constant temperature; and finally grinding the intermediately ground seed leaves to a fine grain size (1000 mesh) at said constant temperature.

The method of the present invention will now be described referring to the accompanying drawing in which one preferred embodiment of apparatus for carrying out the method is shown. Raw soybeans (not shown) are carried by a bucket conveyor 2 on a batch basis to and into a washing block or unit 1 in which the raw soybeans are washed clean by means of a shower screen and the like (not shown) for a short time period (1 – 2 minutes) to remove rubbish, litter, foreign matter and the like adhering to the soybeans, and then dehydrated and dried by a centrifugal hydroextractor (not shown). After the washing and drying, the soybeans are carried by the same bucket conveyor 2 to and into a flat pressing block or unit 3 in which the soybeans are pressed flat by a press roll (not shown) to a degree not to extract oil and fat ingredients from the soybeans for convenience of drying.

After the pressing, the soybeans are carried by the same bucket conveyor 2 to and into a drying block or unit 4 in which endless conveyors (not shown) are disposed on a plurality of spaced levels in a circulating heat atmosphere under constant thermal and humidity conditions (50°– 60° C). In the drying block 4, the flat-pressed soybeans are circulated on the conveyors for about 1 hour until the moisture content of the soybeans is adjusted to about 3%.

After the drying, the soybeans are carried by a bucket conveyor 5 to and into a coarse grinding - blast segregation block or unit 6 in which a coarse grinder 6' and an air blast segregator 7 are provided. In the coarse grinder 6', the flat-pressed and dried soybeans are coarsely ground to a grain size on the order of about 10 mesh, and then allowed to flow down by gravity into the air blast segregator 7 in which the seed coats and seed leaves of the soybeans are separated from each other by a blast of air. Only the separated seed coats are discharged from the segregator via the discharge opening thereof (not shown).

After the segregation, the remaining seed leaves are allowed to flow down by gravity into a deodorization block or digesting unit 8 in which the seed leaves are agitated and vapor is applied thereto (110° – 120° C) from a boiler 9 for about 7 – 8 minutes to remove the odor emitted from the fat contained in the seed leaves. The removed fat odor and the moisture imparted to the seed leaves by the vapor spray are removed by a vacuum suction force from a vacuum suction means 10 to dry the seed leaves to a second predetermined moisture content of about 2%.

After the odor and moisture removal, the seed leaves are allowed to flow down by gravity into a hopper 11 which temporarily stores and feeds the seed leaves on a batch basis to an intermediate grinder 12. In grinder 12 the coarsely ground seed leaves having a grain size of about 10 mesh are ground to a grain size of about 80 – 90 mesh, and then allowed to flow down by gravity into a fine grinder 13 in which the seed leaves are further and finally ground to a grain size of about 1000 mesh. The fine grinder 13 is provided with a thermostat so that the fatty ingredients of the powder will not be bled out and/or the other constituent ingredients of the powder will not be decomposed by the heat.

Reference numeral 14 denotes a storage tank for the resultant soybean powder product which is fed into the tank by air under pressure for delivery to an area where the powder is used for its intended purposes.

The invention as described hereinabove has the following features:

(1) Because the soybeans are preliminarily pressed flat to the degree that the oil and fat ingredients are not bled out of the soybeans and then dried, the soybeans attain a uniform thickness and can be dried uniformly throughout thereof in a brief period of time corresponding to about one-third of the drying time period required by the above-metioned conventional methods.

(2) Because the vapor is sprayed to the coarsely ground seed leaves only after they have been separated from the seed coats, the odor can be simply removed from the soybean fat with substantially no loss of the fat.

(3) Because the deodorized seed leaves are subjected to the different intermediate and fine grinding steps after the dehydration and deodorization, the soybeans can be ground to the micro-fine grain size of about 1000 mesh, as compared with a grain size range of 200-300 mesh which was the finest grain size attainable by the conventional methods. Furthermore, because the seed leaves can be finely ground without decomposing the ingredients of the soybeans, a soybean powder of high nutrient value can be obtained.

(4) The soybean powder produced by the method of the present invention finds many applications, such as bean curds, bean soup, and the like, as well as an additive for milk, confectionary and bakery items.

The constituent ingredients of the soybean powder produced by the method of the present invention were analyzed by the Zaidan Hjin Nihon Shokuhin Bunseki Center (Japanese Food Analysis Center Foundation), and the analysis results are as follows:

| (Sample per 100 g) | |
|---|---|
| Moisture | 3.6% |
| Protein | 38.4% |
| Fat | 25.3% |
| Cellulose | 3.0% |
| Ash | 5.5% |
| Sugar | 24.2% |
| Calories per 100 gram | 455 cal. |
| Pepsin digestion rate | 95.6% |
| Pancreation digestion rate | 90.4% |
| Acid value | 1.23 |
| Peroxide value | 0.81 meg/kg |
| Calcium | 202 mg% |
| Phosphorus | 572 mg% |
| Iron | 9.22 mg% |
| Natrium | 3.4 mg% |
| Vitamin $B_1$ | 0.93 mg% |
| Vitamin $B_2$ | 0.33 mg% |
| General carotin | 55.2 μg% |
| Nicotinic acid | 1.27 mg% |

While only one embodiment of the invention has been shown and described in detail, it will be understood that the same is for illustration purpose only and not to be taken as a definition of the invention, reference being had for the purpose to the appended claims.

I claim:

1. A method of producing fine deodorized soybean powder, comprising the steps of:
 washing raw soybeans;
 pressing said soybeans flat to a degree not to remove fat from said soybeans;
 drying the pressed soybeans in a substantially low temperature environment of approximately 50°-60°

C to attain a first predetermined moisture content of approximately 3%;

coarsely grinding the soybeans to a coarse grain size and separating the soybean seed coats from the soybean seed leaves;

deodorizing said soybean leaves by digesting said leaves;

removing excess moisture from said soybean leaves so that said soybean leaves attain a second predetermined moisture content lower than said first predetermined moisture content;

intermediately grinding said soybean leaves to an intermediate grain size; and finely grinding the intermediately ground soybean leaves to a fine grain size.

2. A method according to claim 1, wherein:

simultaneous with coarsely grinding said soybeans to said coarse grain size, said seed coats and seed leaves of said soybeans are segregated from each other by an air blast while discharging said seed coats out of the system and leaving only said seed leaves; and said seed leaves are vapor-digested to deodorize the seed leaves and at the same time any excess moisture content from said soybean leaves is removed by vacuum suction.

3. A method as set forth in claim 2, in which:

said intermediate grain size is approximately 80 – 90 mesh; and said fine grain size is approximately 1000 mesh.

4. A method as set forth in claim 2, in which: said drying is performed while said soybeans are moving on endless conveyors in a circulating heated atmosphere maintained at approximately 50° – 60° C.

5. A method as set forth in claim 2, in which:

said vapor-digesting is performed by spraying vapor at approximately 110° – 120° C against said coarsely ground soybean seed leaves for approximately 7 – 8 minutes while the seed leaves are being agitated.

6. A method according to claim 1, wherein:

said soybeans are coarsely ground to a coarse grain size of approximately 10 mesh to remove the seed coats from said soybeans while leaving the seed leaves;

said seed leaves are vapor-digested for approximately 7-8 minutes;

the odor of the fat of said seed leaves and at least some of the moisture contained in the seed leaves are removed by vacuum suction;

said seed leaves are intermediately ground to said intermediate grain size at a constant temperature; and said seed leaves are finely ground to a final fine grain size at said constant temperature.

7. A method as set forth in claim 1, in which:

said coarse grain size is approximately 10 mesh;

said intermediate grain size is approximately 80–90 mesh; and said fine grain size is approximately 1000 mesh.

8. An apparatus for producing fine deodorized soybean powder from raw soybeans, comprising:

means for washing said raw soybeans;

said washing means communicating by way of soybean conveying means with means for pressing said soybeans flat to a degree not to remove fat from said soybeans;

said pressing means communicating by way of soybean conveying means with means for drying the pressed soybeans in a substantially low temperature environment of approximately 50°–60° C to attain a first predetermined moisture content of approximately 3%;

said drying means communicating by way of soybean conveying means with means for coarsely grinding the soybeans to a coarse grain size and separating the soybean seed coats from the soybean seed leaves;

said coarse grinding and separating means communicating by way of soybean conveying means with digesting means for deodorizing said soybean leaves;

said digesting means communicating by way of soybean conveying means with means for removing excess moisture from said soybean leaves so that said soybean leaves attain a second predetermined moisture content lower than said first predetermined moisture content;

said excess moisture removing means communicating by way of soybean conveying means with means for intermediately grinding said soybean leaves to an intermediate grain size; and said intermediate grinding means communicating by way of soybean conveying means with means for finely grinding the intermediately ground soybean leaves to a fine grain size.

9. An apparatus according to claim 8, including:

said means for drying said pressed soybeans is adapted to dry said soybeans while conveying the soybeans; and said digesting means for deodorizing said soybean leaves including a vapor spray for spraying said soybean leaves and vacuum suction means for removing moisture imparted to said soybean leaves by said vapor spray, and the odor, from said leaves; and said fine grinding means is adapted to finely grind said soybean leaves at a constant temperature.

10. An apparatus according to claim 8, wherein:

said washing means comprises a washing unit provided with a shower screen for washing and dehydrating said soybeans;

said pressing means comprises a flat-pressing unit provided with a press roll means for pressing said washed and dehydrated soybeans flat to a degree not to remove fat from the soybeans;

said drying means comprises a drying unit having a circulating heated atmosphere and endless conveyors therein for drying said pressed soybeans while the soybeans are moving on said conveyors within said circulating heated atmosphere;

said coarse grinding and separating means comprises a coarse grinding and segregation unit provided with a coarse grinder for coarsely grinding said soybeans to divide the beans into seed coats and seed leaves, and an air blast unit for discharging said seed coats out of the system while leaving said seed leaves;

said digesting means comprises a vapor-digesting unit provided with a vapor digester for removing odor from the fat in said seed leaves by vapor application and vacuum suction means for removing moisture content from said seed leaves to dry the seed leaves.

* * * * *